United States Patent
Dwyer, III et al.

(10) Patent No.: US 6,286,027 B1
(45) Date of Patent: Sep. 4, 2001

(54) TWO STEP THREAD CREATION WITH REGISTER RENAMING

(75) Inventors: Harry Dwyer, III, Annadale; Tor E. Jeremiassen, Somerset; Hubert Rae McLellan, Jr., Summit, all of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/201,034

(22) Filed: Nov. 30, 1998

(51) Int. Cl.[7] ............................................. G06F 9/00
(52) U.S. Cl. ..................... 709/107; 709/108; 712/228; 712/217
(58) Field of Search ........................... 712/228, 23, 217; 709/102, 106, 108, 107

(56) References Cited

U.S. PATENT DOCUMENTS

| | | |
|---|---|---|
| 4,825,360 | 4/1989 | Knight . |
| 5,404,469 * | 4/1995 | Chung et al. ...................... 712/215 |
| 5,724,565 | 3/1998 | Dubey et al. . |
| 5,742,822 | 4/1998 | Motomura . |
| 5,996,068 * | 11/1999 | Dwyer, III et al. .................. 712/228 |
| 6,092,175 * | 7/2000 | Levy et al. ............................. 712/23 |
| 6,105,127 * | 8/2000 | Kimura et al. ....................... 712/215 |

OTHER PUBLICATIONS

Hidaka et al.; Multiple Threads in Cyclic register Windows pp. 131–142, IEEE; 1993.*
Cheng et al.; The Compiler for Supporting Multithreading in Cyclic Register Windows, pp. 57–62; 1996.*
Halstead et al. MASA: A Mutlithreaded Processor Architecture for Parallel Symbolic Computing; pp. 443–451, IEEE.*
English, Lynn R., Thread in Distribution Systems, http://www.engr.csulb.edu/~lenglish/526.html, Nov. 25, 1997.
Waldspurger, Carl A. Register Relocation: Flexible Contexts for Multithreading, International Symposium on Computer Architecture, 1993.
Onion, Fritz, Multithreading in MFC, C++ Report, March 1997.

* cited by examiner

Primary Examiner—Larry D. Donaghue

(57) ABSTRACT

An apparatus and method in digital processing provides a simple and efficient way of communicating parameters from a parent thread to child thread with two step thread creation. The method comprising the steps of: allocating hardware context for the child thread; enabling the parent thread to execute other instructions wherein parent thread register writes update both parent and child architectural registers; and spawning the child thread. In essence, the parent thread sends parameters to the child by writing to the parent's registers prior to spawning of the child thread.

17 Claims, 4 Drawing Sheets

TWO STEP THREAD CREATION WITH REGISTER RENAMING

CROSS-REFERENCE TO RELATED APPLICATIONS

This patent application is related to copending U.S. patent application Ser. No. 08/824,599, entitled Apparatus and Method for Overbooking Registers in Multiple Contexts, now U.S. Pat. No. 5,996,065, by Dwyer, III et al., having a common assignee, which is incorporated fully by reference herein.

FIELD OF THE INVENTION

This invention relates to digital processing, and more particularly to thread creation in digital processing.

BACKGROUND OF THE INVENTION

Users continually request faster and faster processing speeds. This implies either faster hardware or faster program execution speed. Generally, designing and manufacturing faster hardware is expensive, so processing methods have been devised to speed up the execution speed of programs running on existing hardware. One of these methods was the development of threads.

Digital processing utilizes a sequence of program instructions to perform operations of in the processor. A sequential process has a single flow control, a sequence of instructions executed by the process. In a multithreaded process, there are multiple schedulable flows of control called threads. Threads are associated with a sequence of instructions and are often referred to as threads of execution. Threads support the notion of concurrent programming and are used to exploit the inherent hardware parallelism of many computer architectures. By splitting a problem into smaller pieces, a thread can run each piece concurrently.

Traditionally, applications were split into multiple processes, and some form of interprocess communications (IPC) was used to communicate between the processes. A multithreaded process has more than one thread of control sharing both address space and resources. Using threads eliminates the need for IPC and reduces context-switching overhead. Threads are also referred to as lightweight processes (LWPs), since the context maintained for threads is much lighter than for processes. Even though threads are schedulable entities, it does not necessarily mean that they run in parallel. Threads can be scheduled concurrently on multiple processors, while on uniprocessor machines, threads can be time-sliced.

The creation of threads places an important role in processor performance. There is a tradeoff between creating multiple threads to increase effective processor throughput and the overhead associated with thread creation itself.

SUMMARY OF THE INVENTION

In accordance with the present invention, an apparatus and method in digital processing provides a simple and efficient way of communicating parameters from a parent thread to child thread with two step thread creation. The method comprising allocating a hardware context for the child thread; enabling the parent thread for writing to a parent thread register wherein both the parent architectural register and the child architectural register are updated; and spawning the child thread.

DESCRIPTION OF THE DRAWINGS

The present invention is described in detail below in conjunction with the drawings, of which.

DETAILED DESCRIPTION

Figure 1:
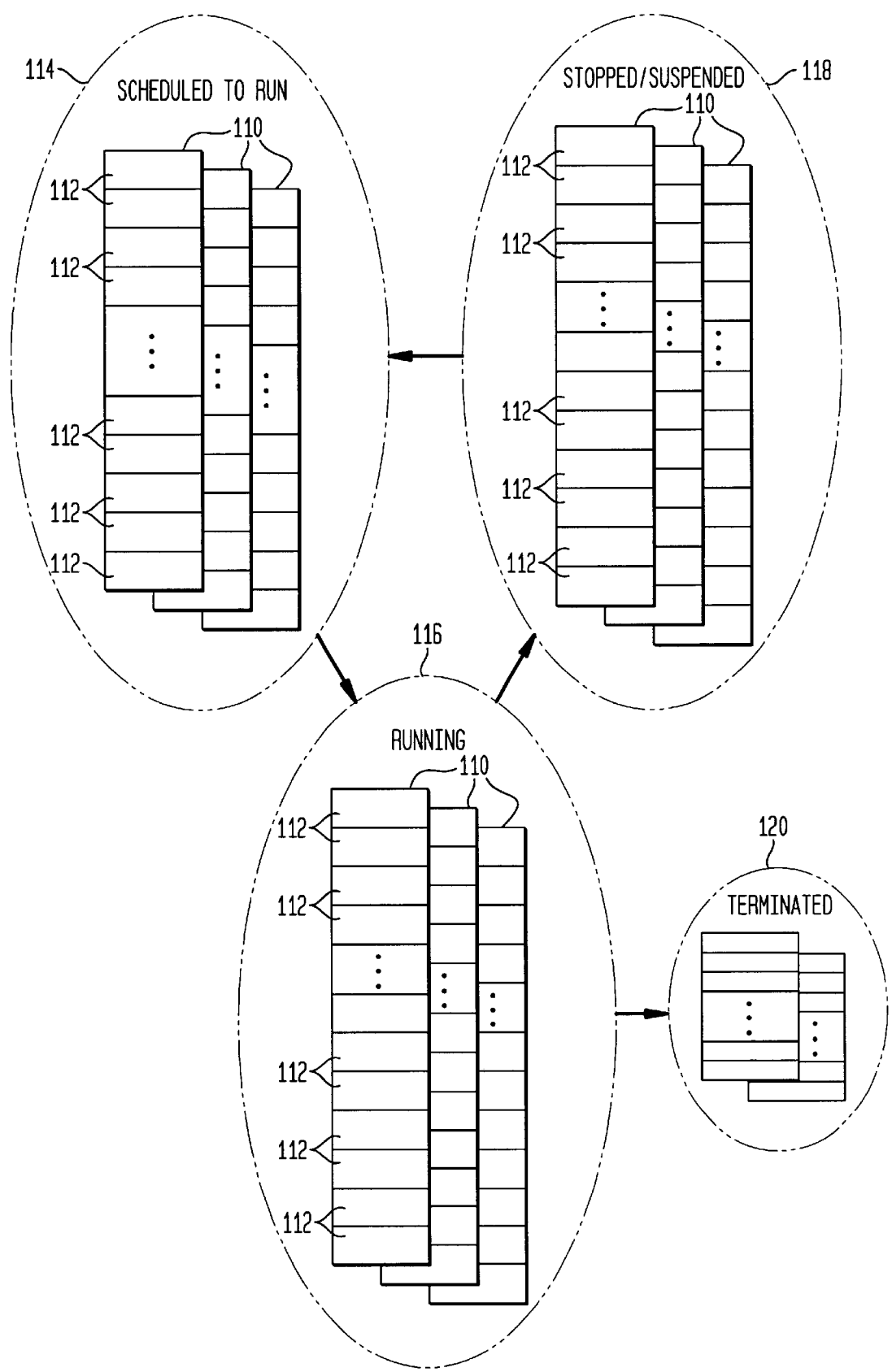
FIG. 1 shows a pool of threads.

A thread is an independent sequence of execution of program code inside a digital process. Referring to FIG. 1, there is a diagrammatic representation of threads within a digital process. A thread 110 contains program code instructions 112 for a digital processor. Threads 110 can be classified into four categories: scheduled to run 114; running 116; stopped/suspended waiting on an event 118; and terminated 120. Threads 110 that are classified as scheduled to run 114 have all necessary information to start execution but are waiting for digital processor resources. When a thread 110 is running 116, it may be terminated 120 by completion or it may be stopped/suspended 118 because running of the sequence of instructions within the thread 110 has resulted in a wait for an event or for data which is not yet available. A more complete understanding of basic thread interfaces for implementing multithreaded applications, thread synchronization, thread specific data, thread interaction and traditional thread creation can be found in "Programming With Threads, 1/e" by Steve Kleiman et al, published by Prentice Hall (1997), which is incorporated herein by reference.

While each thread has access to the information about a process, such as code, registers, data, program counter and stack, each thread is operating independently of any other threads. This means then, that each thread is a single stream of control. Digital processing systems utilize threads to optimize overall system efficiency. Even in a single processor environment, instructions go through a number of distinct steps when they are executed, such as: fetch the instruction; fetch its operands; perform the operation; and store the result. If the steps are performed by independent units, then it is possible to process four instructions at once, each at a different step in its execution. This is a pipeline architecture in which instructions continually flow past the devices.

In the multithreaded process, there are multiple schedulable flows of control called threads. Threads are associated with a sequence of instructions and are often referred to as threads of execution. Even though threads are schedulable entities, it does not necessarily mean that they run in parallel. Threads can be scheduled concurrently on multiple processors. In multithreaded applications, the work of a particular task can be divided between multiple threads. In such cases, one thread might have to wait (be suspended from running) for another thread to reach a particular state before proceeding. This form of synchronization is often called event synchronization.

The creation of threads places an important role in processor performance. There is an inherent tradeoff between creating multiple threads to increase effective processor throughput and the overhead associated with thread creation itself. The present invention provides a simple and efficient way of communicating parameters from a parent thread to child thread with two step thread creation. Splitting instruction sets into subsets of instructions, or two step thread creation, is used to improve system performance.

Multithread Systems

In multithreaded digital processing, a set of instructions comprises a plurality of threads that can be executed in parallel. The threads can be simultaneously processed in parallel by a plurality of multithreading processors. In general, the multithread processor includes a thread parallel start instruction, a thread end instruction, a thread sequential start instruction, and a thread return instruction.

An operation based on thread parallel start instruction generates a thread descriptor and outputs it to other multithread processors. On the other hand, thread execution resulting from a parallel start instruction by a multithread processor, is terminated by the thread end instruction. When the execution of the thread is terminated, the multithread processor receives a new thread descriptor from another multithread processor or from itself, and starts executing the new thread accordingly. Execution of this manner is referred to as a parallel start.

An operation based on a thread sequential start instruction temporarily interrupts the thread being executed, and then executes another thread designated by the thread sequential start instruction. Execution of the thread sequential start instruction is terminated by the thread return instruction, and the processor returns to its default behavior, i.e., the execution of the original thread that was interrupted.

The thread parallel start instruction is also known as a fork instruction. The thread end instruction is also known as a stop instruction or an exit instruction. These conventional methods are often used in multithread processors to save execution steps and optimize memory usage.

Two Step Thread Creation

Two step thread creation techniques can be applied to parent-child thread creation. A significant part of the overhead of multithreading is the processing cost of creating and initializing new threads. For long running threads, this overhead is amortized over a large number of instructions, thus the overhead becomes negligible. For parallel computer implementation, particularly when executing shorter threads on a repetitive basis, the overhead can not be effectively amortized.

Parallelism pertains to the simultaneous transfer, occurrence or processing of the individual parts of a whole, such as bits of a character, using separate facilities for the various parts. In parallel computing, the amount of coarse-grained parallelism necessary o provide useful number of very long running threads with little inter-thread communication is limited in many applications. It is then important to be able to efficiently exploit medium-grained parallelism. The goal is to execute shorter threads in the order of one hundred instructions or less without incurring traditional high thread creation overhead.

A significant source of overhead in creating and initializing new threads is the communication of parameters from the parent thread to the child. For most multithreading architectures the communication from parent thread to child is done through memory. This form of communication is necessary because, no architecture provides user level instructions for directly manipulating registers in another threads contexts. Additionally, the parent thread does not know which hardware context will be used by each thread. Even if direct manipulation of register sets of other threads were possible, it is difficult for the parent thread to know which context belongs to the child thread especially before "spawning" a child thread. Memory manipulation therefore becomes an indispensable part of the process associated with thread creation.

The overhead of using memory to communicate between the parent and child threads has several sources. First, it takes additional instructions to write and then read the parameters to and from memory. When there are cache memory misses and/or coherency operations to construct correlation between tasks performed by a single software module, additional instruction steps and overhead are incurred at the equivalent cost of executing 10s of instructions.

Creating a child thread typically involves two separate actions. First, a hardware context is allocated (the child thread is "conceived"). Second, within the allocated hardware context, execution of the child thread is initiated (the child thread is "spawned"). However, these actions are performed on an atomic level from the perspective of the parent thread.

The present invention applies principles of two step transaction to de-construct the atomic nature of parent-child thread creation into subsets of steps. Two step thread creation makes the separation between the allocation of the hardware context ("conception") and the initiation of execution of the child thread ("spawning") visible to the parent thread by providing separate instructions, or system calls, for each action. Between the two steps ("conception" and "spawning") other instructions can be executed by the parent thread. The advantage in the present invention two step thread creation, is that other instructions, running in the parent's context can transfer parameters to the child thread after "conception" and prior to "spawning" without additional writes or needing other instructions by simply writing to the parent thread registers.

Register Renaming

A multithreading computer may use register renaming to allocate a larger set of architectural registers than physical registers. This is done by providing a map for each hardware context that specifies which physical register each of its architectural registers are mapped to. When an architectural register is written to, a free physical register is allocated, the value is written into this register, and the register map of the corresponding hardware context is updated so that the entry for that architectural register points to the newly written physical register.

An advantage of register renaming is the ability to overbook physical register assignments such as in a multithread architecture. (Copending U.S. patent application 08/824,599, entitled Apparatus and Method for Overbooking Registers in Multiple Contexts, now U.S. Pat. No. 5,996,068, which is incorporated fully by reference herein, describes this technique.) Although some threads access the entire architectural register set, many instruction threads consist of only a fairly short number of instructions and access a limited subset of the full architectural register set before they terminate. Therefore, the average number of physical registers required by each thread is less than the full architectural set of registers. By sharing a pool of physical registers for renaming the architectural registers of several threads, a smaller number of physical registers can provide full architectural register sets for multiple threads.

The rename logic converts architectural register names, or those registers defined in the instruction set, to the internal physical register specifiers. Each register write is assigned a new physical register so memory hazards that were a consequence of a pipeline implementation such as write after write (WAW) and write after read (WAR) dependencies no longer occur. By renaming registers, all artificial data dependencies are eliminated. Only true data dependencies, such as read after write (RAW), remain. By eliminating the unnecessary data dependencies, instructions can be issued more aggressively and overall performance of the system is enhanced.

Figure 2:
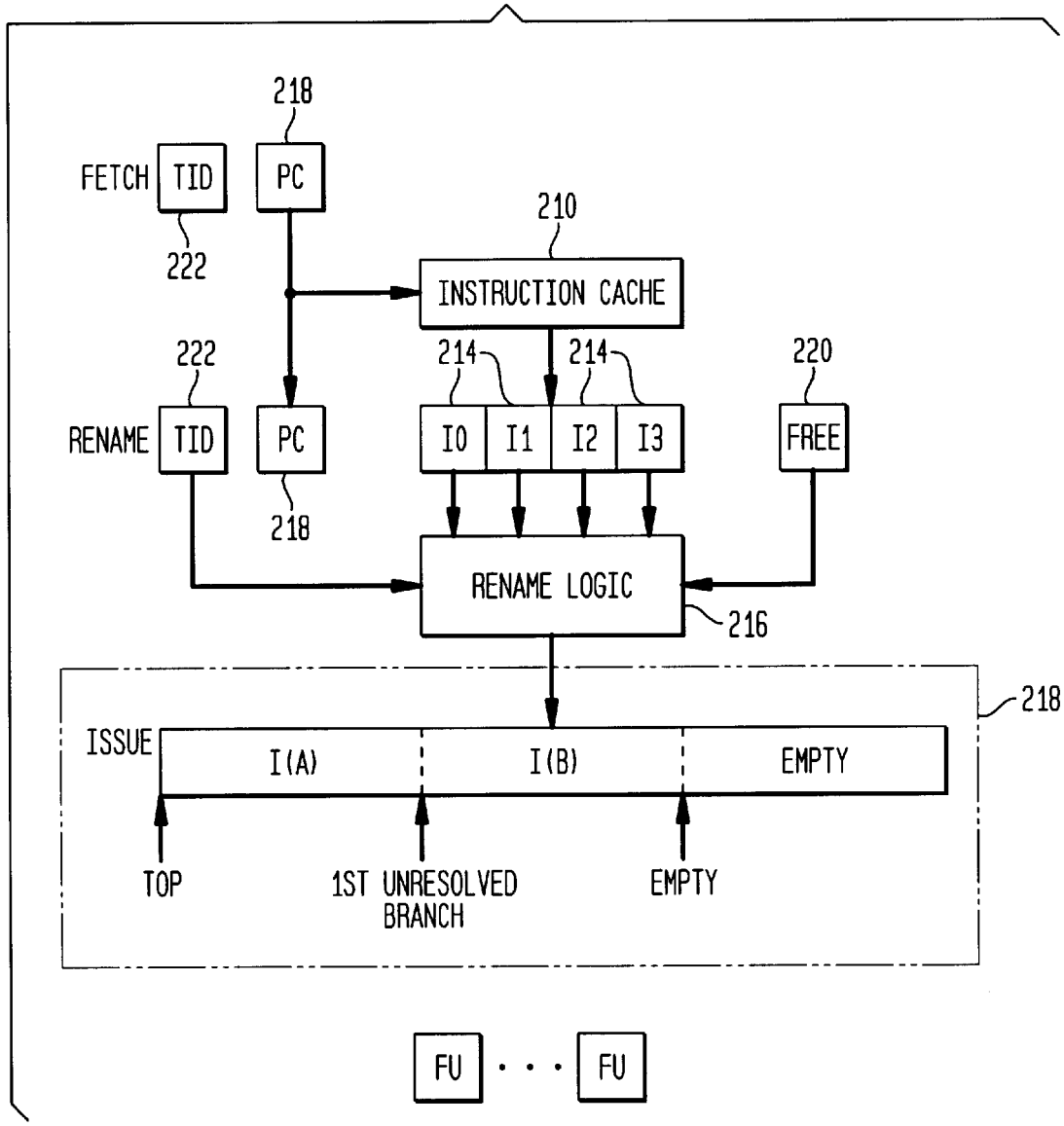
FIG. 2 shows register rename logic.

Referring to FIG. 2 there is shown an exemplary embodiment of the register rename logic. This embodiment describes a four way superscalar architecture. During each clock cycle in the normal sequential flow of instructions, the instruction cache 210 presents a four word cache line to the rename logic stage. The rename logic stage is the first opportunity for these instructions to be decoded. Prior to this stage, all information about these instructions must be inferred from their program counter (PC) 212 value. As the four instructions 214 are decoded, the rename logic 216 converts their architectural register names to physical register specifiers and passes them on to the issue stage 18. Free register 220 contains the name of the next physical register. The thread ID register (TID) 222 selects the register map to use for the instruction set stream.

The TID 222 which selects the register map, selects a different physical map for the architectural registers of each thread, wherein the single pool of shared physical registers are able to support the architectural registers of multiple threads.

Two Step Threading with Register Renaming

In one embodiment of the present invention, register renaming is used with two step thread creation in a hardware mechanism to provide an economical way of communicating parameters from a parent thread to the child thread.

As described above, thread creation comprises the steps of allocating a hardware context and then initiating the execution of the child thread therein. An instruction, or system call, allocates a hardware context for the child thread. The parent thread can then communicate parameters to the "conceived" but not yet "spawned" child by writing to parent thread registers. Register renaming is manipulated such that the parent thread can send parameters to the child thread without incurring additional memory or instruction steps. Until the system call or instruction that "spawns" the execution of the child thread is executed, the register renaming process is altered to update the architectural to physical register mappings for both parent and child. In this way, parameters can be communicated from parent to child via register writes.

Figure 3:
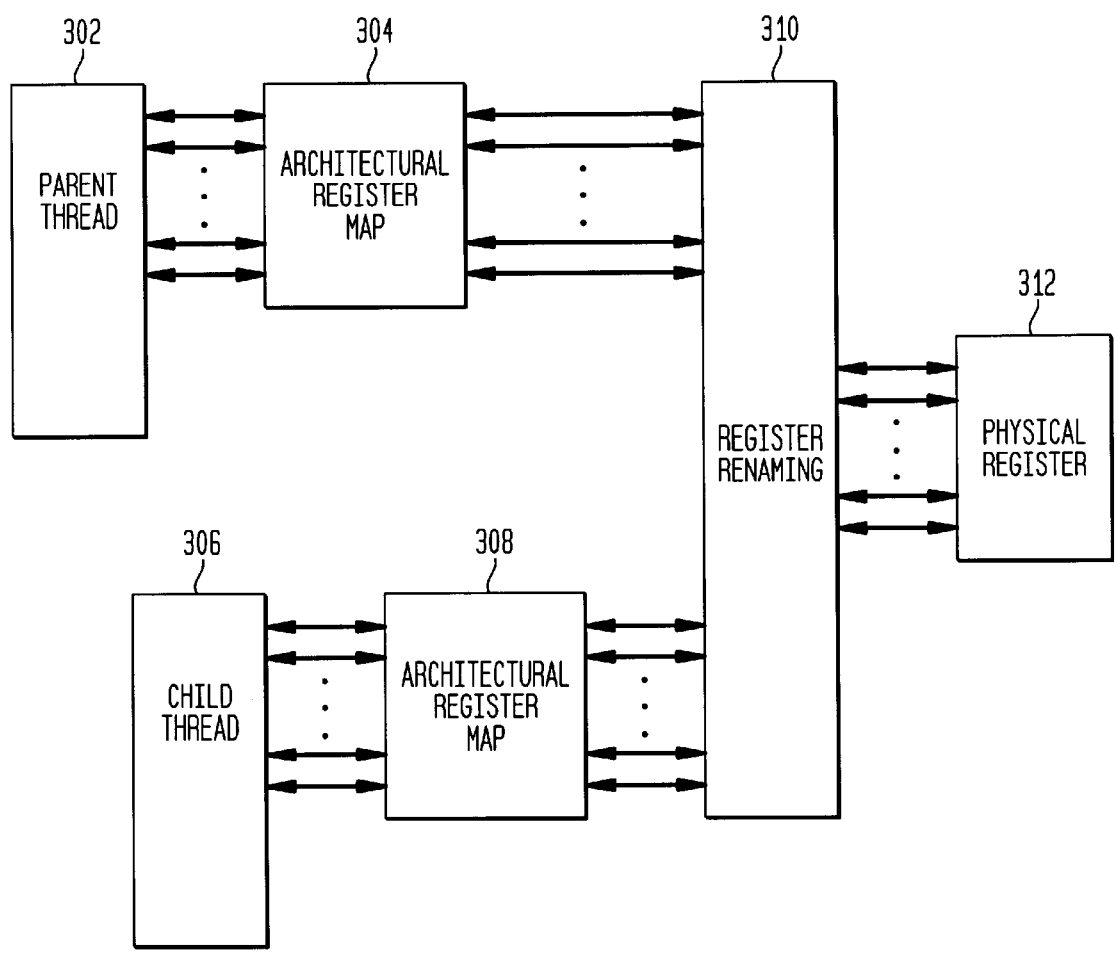
FIG. 3 shows a diagrammatic representation of the relation of threads, architectural register map and physical registers with respect to register renaming; and, FIG. 4 shows a flow chart of two step thread creation.

Referring to FIG. 3 there is shown the relationship between parent and child thread prior to "spawning" of the child and their corresponding architectural register map. Parent thread 302 is associated with a particular set of corresponding architectural register map 304. The child thread 306 is associated with a particular set of corresponding architectural register map 308. Register renaming device 310 associates physical registers 312 with corresponding architectural register map 304 and 308.

Whenever the parent thread 302 performs a write instruction to a register, the architectural register map 304 and 308 for both the parent and child threads are updated to point to the newly written physical register 312. When the child thread is "spawned", register renaming reverts back to its default behavior.

The present invention provides for the communication between the parent thread 302 and the child thread 306 by storing values into the physical registers 312 which correspond to the parent thread 302. This makes explicit stores to memory unnecessary and preloads the child thread 306 so that fewer memory load instructions are executed. Furthermore, as the same physical register 312 is utilized to store the value for both the value for the parent thread 302 and the child thread 306, fewer physical registers 312 are necessary to support multiple thread contexts. The register renaming device 310 provides for parallel updating to the corresponding architectural register map 304 of the parent thread 302 and the corresponding architectural register map 308 of the child thread 306 before the child thread 306 is "spawned".

When the child thread 306 is "spawned", the child thread 306 may be scheduled to be run. After "spawning", if either the child thread 306 or parent thread 302 writes to their corresponding architectural register map 304 and 308, the register renaming device 310 assigns a free physical register 312 and updates the corresponding architectural register map 304 or 308 of the thread 302 or 306 which initiated the write. The other thread 302 or 306 which did not initiate the write is still associated with the prior corresponding physical register 312.

The benefit of this approach is two-fold. First, values are communicated between the parent and the child threads merely by storing them into the parent thread's own set of architectural registers. This makes explicit stores to memory superfluous. More importantly, this mechanism serves to preload the registers of the child thread so it has to execute fewer memory load instructions. Second, since the same physical register is used to store the value for both the parent and the child thread, fewer physical registers are needed to support multiple thread contexts.

Figure 4:
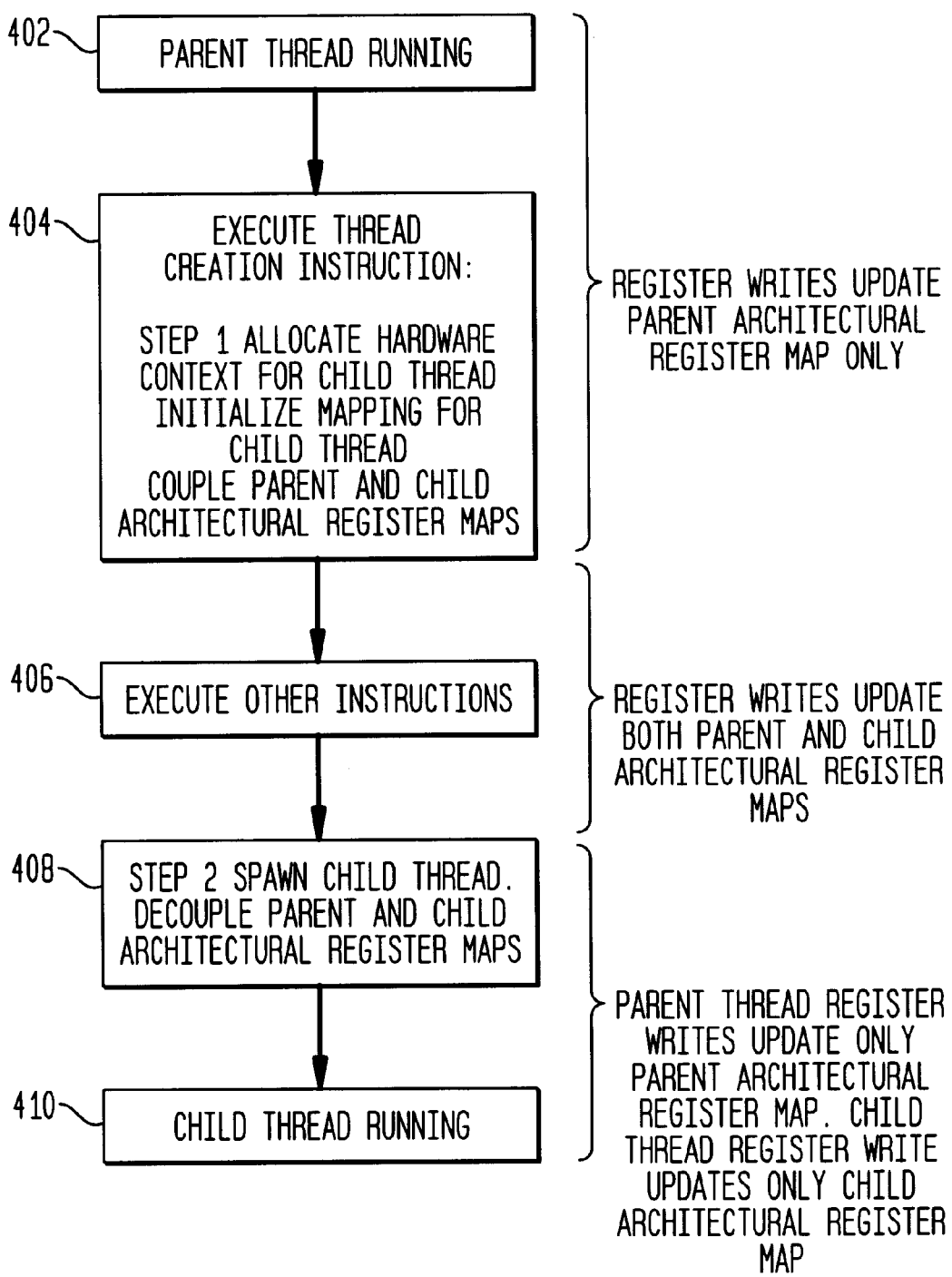

Referring to FIG. 4, two step thread creation with register renaming is shown in a flow sequence. In step 402 the parent thread is running. During this step register writes by the parent thread update the parent architectural register map only. In step 404 execution of the two step thread creation instruction is started. Now allocation of the hardware context for child thread occurs and the architectural to physical mapping for child thread is initialized. Subsequently the parent Architectural Register Map and child Architectural Register Map are coupled for writes. Register writes by the parent thread update both parent and child Architectural Register Map. In step 406 the parent thread may execute other instructions including writes to its registers. In step 408 step two of the two steps occurs, the child thread is "spawned". At this time the parent Architectural Register Map and child Architectural Register Map are decoupled. Subsequently a parent thread register write will updates only parent Architectural Register Map and a child thread register write updates only the child Architectural Register Map. In step 410 the child thread running.

Numerous modifications and alternative embodiments of the invention will be apparent to those skilled in the art in view of the foregoing description. One such modification is to initialize the child thread's architectural registers to point to the same physical register as the parent thread rather than null. This would pass all of the parent's architectural register values to the child when the child is "spawned". The child thread may be spawned to run on a separate processor or even a separate digital system in a highly parallel environment. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

We claim:

1. In a digital processing system a method for communicating values between a parent thread having parent architectural registers and a child thread, the method comprising the steps of:

allocating child architectural registers for the child thread;

enabling the parent thread for writing to a parent thread register wherein both the parent architectural register and the child architectural register are updated; and spawning the child thread.

2. The method as recited in claim 1 wherein the child architectural registers correspond to a child architectural register map to physical registers.

3. The method as recited in claim 1 wherein the parent architectural registers correspond to a parent architectural register map to physical registers.

4. The method as recited in claim 1 further comprising the step of initializing the child architectural registers to null.

5. The method as recited in claim 1 further comprising the step of initializing the child architectural registers to the parent architectural registers.

6. The method as recited in claim 1 wherein the step of spawning the child thread further comprises the child thread being ready to run.

7. The method as recited in claim 6 wherein the child thread is ready to be run on a parallel processor.

8. In a digital processing system a device for communicating values between a parent thread having parent architectural registers and a child thread, the device comprises:

allocating means for allocating associated child architectural registers for a child thread;

processor means for enabling the parent thread for writing to the parent architectural registers corresponding to a particular register; and a register remapping device for remapping the child architectural registers to correspond to the write to the parent architectural registers;

wherein after spawning the child thread, a first write, by the child thread to the particular register or by the parent thread to the particular register will be assigned a free physical register by the register remapping device.

9. The device as recited in claim 8 wherein the child architectural registers comprises a child architectural register map to physical registers.

10. The method as recited in claim 8 wherein the parent architectural registers comprises a parent architectural register map to physical registers.

11. The device as recited in claim 8 wherein the child architectural register map is initialized to null.

12. The device as recited in claim 8 wherein the child architectural registers are initialized to correspond to the parent architectural register map.

13. The device as recited in claim 12 wherein the corresponding parent architectural register is mapped to a physical register.

14. The device as recited in claim 8, wherein the register renaming device further comprising:

a plurality of physical registers;

a plurality of architectural register maps;

a rename logic; and mapping means being responsive to threads from said processing means such that a different physical map is selected for architectural registers of each thread.

15. The device as recited in claim 14, wherein a corresponding entry in said architectural register maps is indicative of an invalid state or valid state, said entry of said valid state containing an index of a physical register to which a corresponding architectural register is mapped.

16. The device as recited in claim 14 wherein after spawning, the child thread is ready to run.

17. The device as recited in claim 16 wherein the child thread is ready to be run on a parallel processor.

* * * * *